April 24, 1928.
S. HALLE
1,667,595
TEMPERATURE CONTROL MEANS
Original Filed April 5, 1921
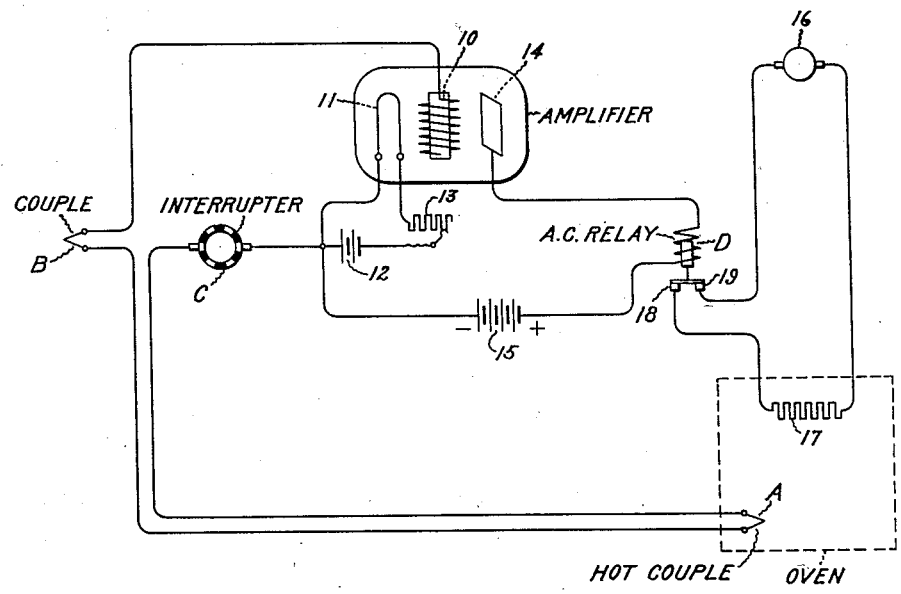
Inventor:
Simon Halle,
by *Alexander S. ____*
His Attorney.

Patented Apr. 24, 1928.

1,667,595

UNITED STATES PATENT OFFICE.

SIMON HALLE, OF COLORADO SPRINGS, COLORADO, ASSIGNOR TO EDISON ELECTRIC APPLIANCE COMPANY, INC., A CORPORATION OF NEW YORK.

TEMPERATURE-CONTROL MEANS.

Original application filed April 5, 1921, Serial No. 458,686. Divided and this application filed March 1, 1926. Serial No. 91,321.

My invention relates to temperature control means for heated apparatus of various kinds, such as ovens, furnaces, etc., and has for its object the provision of simple and reliable means for controlling the temperature in a predetermined manner.

This application is a division of my copending application, Serial No. 458,686, filed April 5, 1921.

In one of its aspects my invention relates to means for maintaining a predetermined temperature. My invention has particular application in the operation of electrically heated apparatus, such as electric ovens, furnaces and the like, although it has obvious application to heated apparatus in general regardless of the source of heat.

In carrying out my invention in one form I employ a vacuum tube together with temperature responsive means for controlling the vacuum tube and means controlled by the vacuum tube for controlling the source of heat.

For a more complete understanding of my invention reference should be had to the accompanying drawing in the single figure of which is shown in diagrammatic form the connection of a relay as used in the control of the heating circuit of an oven.

In the accompanying drawing, illustrating one form of my invention as applied to the control of an electric oven, a thermocouple is shown consisting of the usual hot couple A, which is in the oven, and cold couple B, which is at a suitable point without the oven. In circuit with the thermocouple is an interrupting device C of some suitable form, the function of which is to transmit in the form of pulsations the voltage set up by the thermocouple. One terminal of the thermocouple is connected to the grid 10 of a three electrode vacuum tube amplifier while the other terminal of the thermocouple is connected to the filament 11 of the amplifier. The filament 11 of the amplifier is heated by the battery 12 which is connected in a local heating circuit with an adjustable resistance 13. The terminals of the alternating current relay D are connected to the filament 11 and to the plate 14, respectively, of the amplifier, the relay circuit being maintained at a constant potential by a battery 15 connected therein. A heating circuit for the oven comprising a suitable generator 16 and resistance 17 is controlled by the alternating current relay through contacts 18 and 19.

The function of the cold couple is to compensate for changes in room temperature. It is maintained at a suitable constant low temperature, for example, by immersing it in a beaker of ice water. The two couples, the thermo-electric characteristics of which are the same, are connected in series in such manner that their electromotive forces are in the same direction under normal conditions, that is, with the room temperature higher than the temperature of the cold couple and lower than the temperature of the oven. Assuming, now, an increase in room temperature, the temperature of the couples remaining constant, the electromotive force of the hot couple will diminish while the electromotive force of the cold couple will increase to the same extent, leaving the resultant electromotive force unchanged. In a similar manner, if the room temperature diminishes the changes in the electromotive forces of the two couples will exactly offset each other.

With the system arranged as shown and described the amplifier will operate in a well known manner, the filament being heated to a suitable temperature by battery 12 whereupon a constant current is set up in the relay circuit by battery 15. The circuit interrupter is run at a constant speed, such as by a small electric motor, to give pulsations of a frequency to which the alternating current relay is responsive. The relay is not affected by the constant current supplied to the relay circuit by battery 15. As the temperature of the oven is raised by the heating of resistance 17 from current supplied to it by generator 16, the voltage generated by the thermocouple increases. This voltage, which is responsive to the temperature, sets up a current between the grid and the filament of the amplifier; this causes the current set up in the relay circuit by battery 15 to vary in a well known manner. By means of the interrupter, the thermocouple voltage is applied to the amplifier in pulsating form so that in effect a pulsating current having the same period as the thermocouple current, but greatly amplified, is superimposed on the constant current in the relay circuit. The purpose of the interrupter is thus to cause the current in the plate circuit to pulsate with a frequency to which the alternating current relay is responsive.

Assuming that it is desired to start the oven, contacts 18 and 19 being closed, the heating circuit to resistance 17 in the oven is completed by a suitable switch (not shown). The heating circuit is now controlled by the alternating current relay through contacts 18 and 19 in response to the voltage set up by the thermocouple to maintain a predetermined average temperature in the oven. At a certain predetermined maximum temperature of the oven, the pulsating current in the relay circuit is strong enough to operate the relay to open the heating circuit of the oven at contacts 18 and 19. The oven now cools until a certain predetermined minimum temperature is reached when the effect of the thermocouple on the relay has decreased to such an extent that the relay operates to close the heating circuit through contacts 18 and 19. The temperature of the oven now increases to the maximum value when the heating circuit is again broken as previously described, the cycle being repeated to maintain a certain desired average temperature in the oven.

Although I have shown an interrupter for producing more rapid pulsations in the current set up by the thermocouple, in certain cases where the changes in temperature to which the thermocouple is subjected are sufficiently rapid, the circuit interrupter will not be necessary. The varying voltage of the thermocouple will then act directly on the amplifier.

Instead of controlling the heating circuit directly, the alternating current relay can be arranged to control a circuit to a contactor in the heating circuit. The contacts 18 and 19 are then interposed in the contactor control circuit. Such an arrangement may be desirable in the control of large heating units. By using more than one amplifier, a plurality of amplifying steps can be provided.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. Apparatus for controlling temperature comprising a source of heat, an amplifier for controlling said source, and thermosensitive means in the input circuit of said amplifier.

2. Apparatus for controlling temperature comprising a source of heat, a vacuum tube for controlling said source and thermosensitive means in the input circuit of said vacuum tube.

3. In combination, an electric discharge device having a cathode, grid and anode, means for maintaining a normal potential relation between said grid and cathode, thermally controlled means to vary said potential relation, and means in the output circuit operable upon change of space current.

4. A temperature control for ovens comprising a thermoelectric device subjected to the temperature in the oven producing a current proportional to the temperature in the oven, amplifying means for producing a current proportional to but greater in magnitude than the current set up by said thermoelectric device, and control means for said oven responsive to said amplified current.

5. A temperature control for electric ovens comprising a thermoelectric device subjected to the temperature in the oven producing a current proportional to the temperature in the oven, control means for the heating circuit of said oven, and an electron discharge tube amplifier in electrical connection with said thermo-electric device and said control means whereby a current is set up in said control means which is proportional to but greater in magnitude than the current set up by said thermoelectric device.

6. A temperature control for electric ovens comprising an electron discharge tube having grid and plate circuits, a thermoelectric device subjected to the temperature in the oven connected in the grid circuit of said tube, and control means for the oven connected in the plate circuit of said tube.

7. The combination with an electric oven, of a heating circuit therefor, an electron discharge tube having grid and plate circuits, a thermoelectric device in said oven connected in the grid circuit of said tube, and a relay for controlling the heating circuit of said oven connected in the plate circuit of said tube.

8. The combination with an electrically heated device, of a heating circuit therefor, an electron discharge tube having grid and plate circuits, a thermoelectric device responsive to the temperature in said device, electrical connections between said thermoelectric device and the grid circuit of said electron discharge, a circuit interrupter in said connections for producing pulsation in said grid circuit, and means for controlling said heating circuit connected in said plate circuit.

In witness whereof, I have hereunto set my hand this 24th day of February, 1926.

SIMON HALLE.